US012692926B2

(12) United States Patent

Broadbent

(10) Patent No.: US 12,692,926 B2

(45) Date of Patent: Jul. 28, 2026

(54) ANCHOR FOR SECURING AN ELASTIC CORD

(71) Applicant: Tailfin Limited, Bristol (GB)

(72) Inventor: Nicholas Broadbent, Long Ashton North (GB)

(73) Assignee: TAILFIN LIMITED, Bristol (GB)

( * ) Notice: Subject to any disclaimer, the term of this patent is extended or adjusted under 35 U.S.C. 154(b) by 5 days.

(21) Appl. No.: 18/581,846

(22) Filed: Feb. 20, 2024

(65) Prior Publication Data

US 2024/0280161 A1 Aug. 22, 2024

(30) Foreign Application Priority Data

Feb. 21, 2023 (GB) ...................................... 2302460

(51) Int. Cl.
F16G 11/10 (2006.01)
B62J 7/08 (2006.01)
(52) U.S. Cl.
CPC ............... F16G 11/103 (2013.01); B62J 7/08 (2013.01)
(58) Field of Classification Search
CPC .... F16G 11/103; F16G 11/046; F16G 11/106; B62J 7/08; Y10T 24/3918; Y10T 24/39; Y10T 24/3916; Y10T 24/47; Y10T 24/4755; B65D 41/22
USPC ........................................ 220/315, 324, 326
See application file for complete search history.

(56) References Cited

U.S. PATENT DOCUMENTS

| | | | | |
|---|---|---|---|---|
| 317,350 | A | * | 5/1885 | Hasskarl ................. F16G 11/00 |
| | | | | 24/129 R |
| 736,631 | A | * | 8/1903 | Priddat ..................... A45F 5/10 |
| | | | | 30/124 |
| 4,373,463 | A | * | 2/1983 | Beaudette ............... B63B 21/08 |
| | | | | 24/129 R |
| 4,719,668 | A | * | 1/1988 | Cavanagh ............... F16G 11/12 |
| | | | | 24/130 |
| 5,519,921 | A | * | 5/1996 | Templer, Jr. ............ B63B 21/08 |
| | | | | 24/130 |

(Continued)

FOREIGN PATENT DOCUMENTS

CA 2273702 A1 11/1999

OTHER PUBLICATIONS

UK Search report mailed Jul. 27, 2023 in co-pending GB Application No. 2302460.7.

*Primary Examiner* — Jason W San
*Assistant Examiner* — Rowland Do
(74) *Attorney, Agent, or Firm* — Perilla Knox & Hildebrandt LLP

(57) ABSTRACT

An anchor for securing an elastic cord includes first and second spaced walls defining an anchoring passage, an anchoring cavity provided at one end of the anchoring passage, at least one retaining tooth projecting into the anchoring cavity for locking engagement with a section of the cord situated within the anchoring cavity, and a non-linear path provided by the anchoring passage and extending from the anchoring cavity to the exterior of the anchor. The non-linear path undergoes at least two changes of direction between the anchoring cavity and the exterior of the anchor. The non-linear path is defined by a pillar extending from the first wall into a recess in the second wall and a bridge section of the second wall, where the bridge section includes opposite ends which are connected by respective webs to the first wall to provide a bridge passage.

16 Claims, 3 Drawing Sheets

(56) References Cited

U.S. PATENT DOCUMENTS

| | | | | |
|---|---|---|---|---|
| 5,987,710 | A * | 11/1999 | Paul | F16G 11/103 |
| | | | | 24/130 |
| 6,094,783 | A * | 8/2000 | Parsons | F16G 11/14 |
| | | | | 24/130 |
| 6,260,498 | B1 * | 7/2001 | Cochran | F16G 11/103 |
| | | | | 24/130 |
| 6,269,523 | B1 * | 8/2001 | Benoit | F16G 11/14 |
| | | | | 24/130 |
| 6,557,217 | B2 * | 5/2003 | Szabo | F16G 11/14 |
| | | | | 24/129 B |
| 6,763,776 | B1 * | 7/2004 | Perri | B63B 21/08 |
| | | | | 24/129 R |
| 6,928,704 | B2 * | 8/2005 | Johnson | E06B 9/324 |
| | | | | 24/130 |
| 7,337,504 | B1 * | 3/2008 | Casey | B63B 21/08 |
| | | | | 24/134 P |
| 7,614,179 | B2 * | 11/2009 | Kavanaugh | A01K 91/03 |
| | | | | 24/130 |
| 8,584,323 | B2 * | 11/2013 | Pang | F16G 11/048 |
| | | | | 24/132 R |
| 9,120,541 | B1 | 9/2015 | Turner et al. | |
| 9,157,505 | B2 * | 10/2015 | Seader | F16G 11/046 |
| 2006/0096067 | A1 * | 5/2006 | Fontaine | F16G 11/103 |
| | | | | 24/130 |
| 2008/0110000 | A1 * | 5/2008 | Orr | F16G 11/12 |
| | | | | 24/130 |
| 2013/0284743 | A1 * | 10/2013 | Paugh | E05C 19/14 |
| | | | | 220/326 |
| 2014/0101898 | A1 * | 4/2014 | Chu | A44B 11/06 |
| | | | | 24/115 A |
| 2018/0058543 | A1 * | 3/2018 | Sze | F16G 11/103 |
| 2018/0317612 | A1 * | 11/2018 | Koreishi | A44B 11/04 |
| 2019/0285137 | A1 * | 9/2019 | Kuo | D04G 5/00 |
| 2019/0301567 | A1 * | 10/2019 | Moss | F16G 11/106 |
| 2021/0123502 | A1 * | 4/2021 | Zitzmann | F16G 11/14 |

* cited by examiner

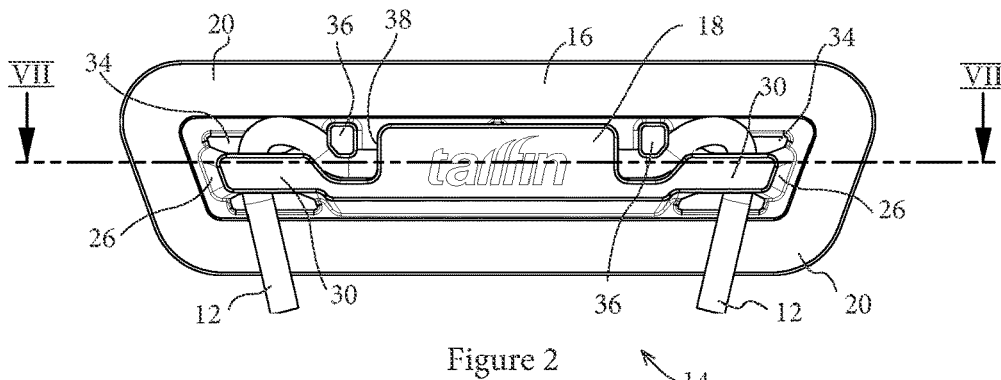
Figure 2
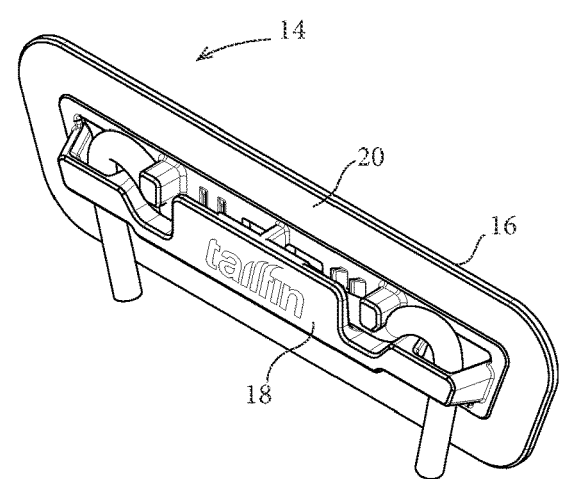
Figure 3
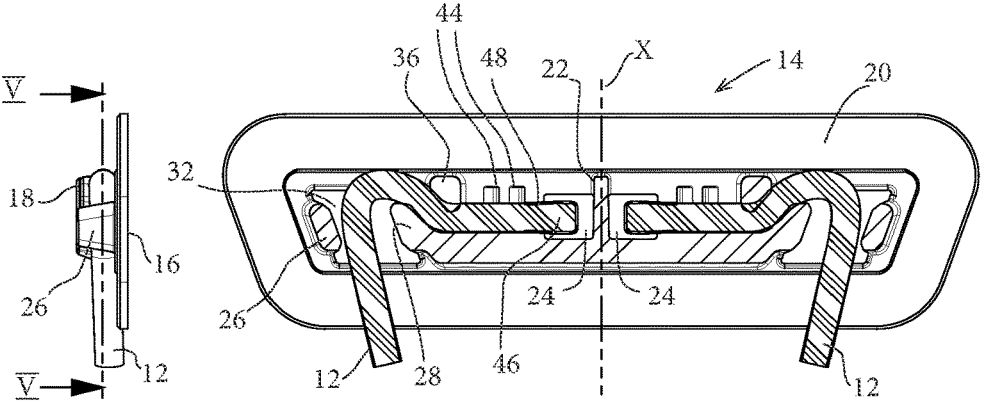
Figure 4                          Figure 5

ANCHOR FOR SECURING AN ELASTIC CORD

FIELD OF THE INVENTION

This invention relates to an anchor for securing an elastic cord, and is particularly, although not exclusively, concerned with an anchor for securing a latch component to a container such as a bicycle cargo pack by means of a loop of elastic cord.

BACKGROUND

It is known to provide cargo packs on bicycles for accommodating items which need to be carried. For example, bikepacking is a popular pursuit for cyclists, and requires the cyclist to carry on the bicycle all of the equipment needed for an extended cycling tour. Cargo packs are known, but there is a need for packs which can be opened and closed easily, especially when using a single gloved hand. Backpacking and other cycling activities can subject bicycles, and cargo packs fitted to them, to severe conditions. Also, repeated opening and closing of cargo packs can place a significant strain on them, and on fasteners used to hold them closed. Breakages can frequently occur and it is desirable for repairs to be possible in a simple manner which does not affect the functionality or appearance of the original component.

Elasticated cord in the form of a stretchy rubber core encased in a braided outer sheath is known, and is commonly referred to as bungee cord or shock cord. Such cord can be used in various applications in connection with cargo packs for bicycles. The cord can degrade or snap over time. Known measures for replacing the cord use stitching to secure the cord to a flap or other component of a cargo pack, or to provide a hole in the component through which the cord is passed and then knotted to prevent return. Stitching can be unsightly and can damage the cord and the material of the flap, while the use of a hole and knotted cord is a bulky solution causing the flap to sit proud, since a knot unavoidably has a thickness at least double that of the court diameter.

SUMMARY

According to the present invention there is provided an anchor for securing an elastic cord, comprising: first and second spaced walls which define between them an anchoring passage; an anchoring cavity provided at one end of the anchoring passage; at least one retaining tooth projecting into the anchoring cavity for locking engagement with a section of the cord situated within the anchoring cavity; and a non-linear path provided by the anchoring passage and extending from the anchoring cavity to the exterior of the anchor, the non-linear path undergoing at least two changes of direction between the anchoring cavity and the exterior of the anchor. The non-linear path is defined by: a pillar extending from the first wall into a recess in the second wall; and a bridge section of the second wall, the bridge section being connected at each end to the first wall to provide a bridge passage. The anchoring passage extends from the anchoring cavity around the pillar to provide a first one of the changes of direction and through the bridge passage to provide a second one of the changes of direction.

The anchoring cavity may be provided at its end away from the non-linear path with a chamber for accommodating a cord tip.

A clearance may be provided between the pillar and the edge of the recess.

The recess may be formed in an edge of the second wall.

The second change of direction may be in the opposite sense to the first change of direction.

The through direction of the bridge passage may extend transversely of the lengthwise direction of the anchoring cavity.

An opening may be defined between the walls. The opening may provide access from the exterior of the anchor to the anchoring cavity.

The anchor may further comprise a cord which is situated in the anchoring passage. The court may have a first section in locking engagement with the tooth of the anchoring cavity, a second section extending through the anchoring passage and undergoing at least two changes of direction, and a third section extending at the exterior of the anchor.

The anchoring cavity may be provided at its end away from the non-linear path with a chamber for accommodating a cord tip. A tip region of the cord may be accommodated in the chamber.

The tip region of the cord may be provided with an end fitting.

The end fitting may comprise a shrink fitted sleeve.

The anchoring passage may be one of two anchoring passages disposed symmetrically about a centreline of the anchor.

Opposite ends of a single cord may be anchored in the respective anchoring passages of the anchor to form a loop.

The loop may extend through a latching component.

Another aspect of the invention provides a container provided with a latching arrangement, the latching arrangement including an elastic cord secured to the container by an anchor comprising: first and second spaced walls which define between them an anchoring passage within which the cord is situated; an anchoring cavity provided at one end of the anchoring passage; at least one retaining tooth projecting into the anchoring cavity, the retaining tooth being in locking engagement with a section of the cord situated within the anchoring cavity; a non-linear path provided by the anchoring passage and extending from the anchoring cavity to the exterior of the anchor, the non-linear path undergoing at least two changes of direction between the anchoring cavity and the exterior of the anchor. The non-linear path is defined by: a pillar extending from the first wall into a recess in the second wall, the cord being deflected around the pillar; and a bridge section of the second wall, the bridge section being connected at each end to the first wall to provide a bridge passage through which the cord extends. The anchoring passage extends from the anchoring cavity around the pillar to provide a first one of the changes of direction and through the bridge passage to provide a second one of the changes of direction.

The container may comprise a cargo pack for mounting on a bicycle.

BRIEF DESCRIPTION OF THE DRAWING FIGURES

For a better understanding of the present invention, and to show more clearly how it may be carried into effect, reference will now be made, by way of example, to the accompanying drawings, in which:

FIG. 2 shows an anchor for the shock cord of FIG. 1;

FIG. 3 is a perspective view of the anchor of FIG. 2;

FIG. 4 is a side view of the anchor of FIGS. 2 and 3;

FIG. 5 is a sectional view taken on the line V-V in FIG. 4;

DETAILED DESCRIPTION

Figure 1:
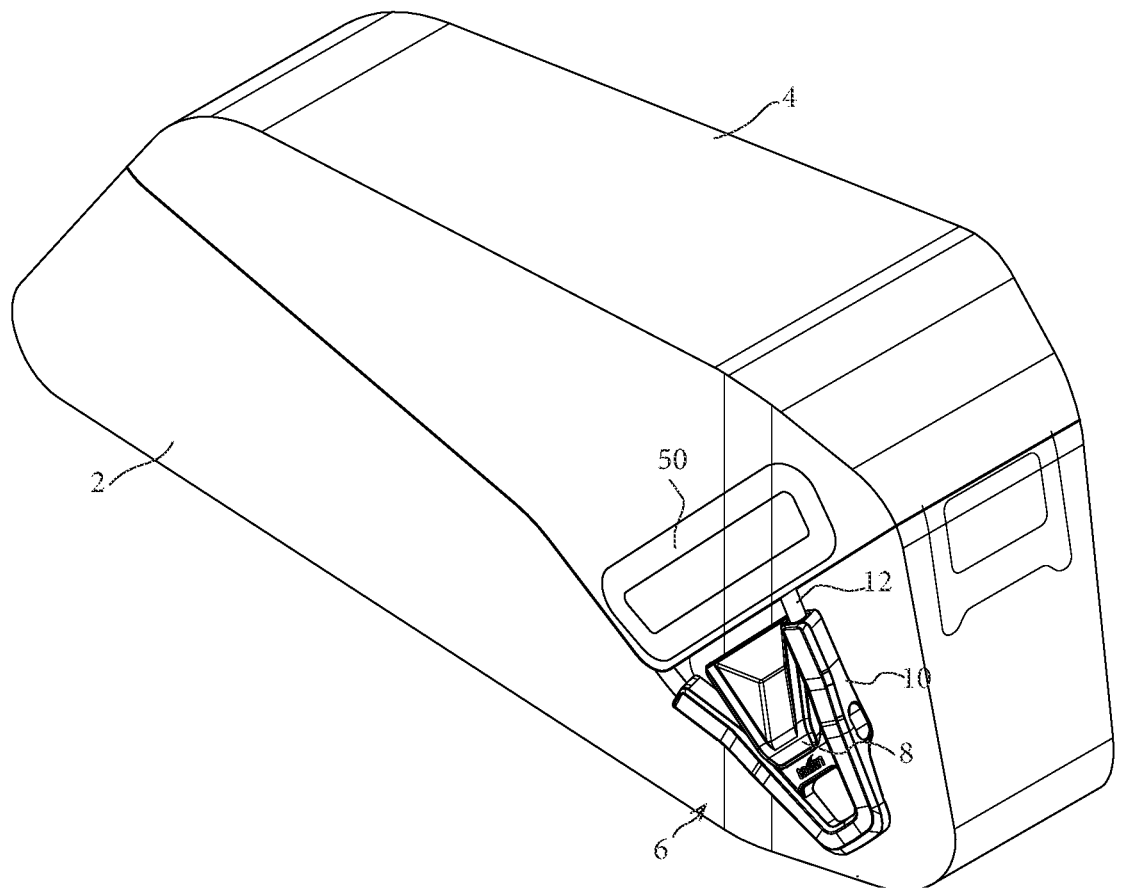
FIG. 1 shows a cargo pack for mounting on a bicycle, having a latch mechanism utilising a shock cord.
Figure 6:
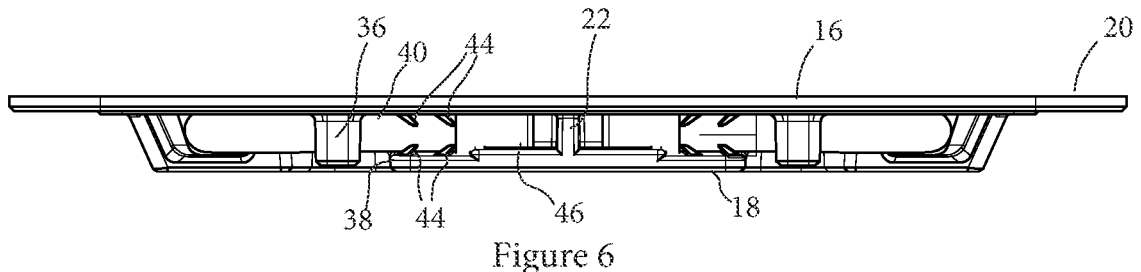
FIG. 6 is a top view of the anchor.
Figure 7:
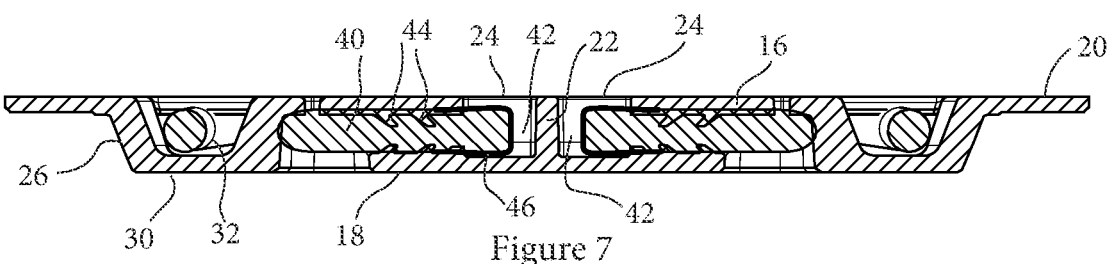
FIG. 7 is a sectional view taken on the line VII-VII in FIG. 2.

The cargo pack shown in FIG. 1 comprises a body 2 and a lid 4. The body 2 is provided with a mounting arrangement (not shown). Securing the cargo pack to a bicycle, for example to a rack fitted over the rear wheel of the bicycle. Alternatively, the cargo pack may be fitted to other frame members of the bicycle, for example the top tube. The lid 4 is secured over the body 2 by a latch mechanism 6 which is shown in the latched condition in FIG. 1 and comprises a component 8 in the form of a projection over which fits a latch element 10.

The latch element 10 is secured to the lid 4 by means of a loop of shock cord 12 which runs through a passage within the interior of the latch element 10. The shock cord 12 is a loose fit in the passage, so that it can move in its lengthwise direction. Consequently, the shock cord 12 is able to stretch over substantially its full length.

The ends of the shock cord 12 emerge from the latch element 10 and are secured to an anchor 14 (see FIGS. 2 to 7). As shown in FIG. 2, the anchor 14 comprises a unitary moulded body having first and second parallel walls 16, 18 which can be regarded as inner and outer walls and are spaced apart from each other. The periphery of the inner wall 16 comprises a skirt 20 which is secured to the inside face of the lid 4. The skirt may be attached to the lid 4 by stitching, in which case the anchor 14 may be made from a material such as a polyamide, for example nylon. However, it can alternatively be secured by welding if the materials of the anchor 14 and the lid 4 are compatible. For example, the anchor 14 may be made from a thermoplastic polyurethane (TPU), and the lid 4 may be made from a similar weldable woven or non-woven fabric.

As shown in FIGS. 2 to 7, the shock cord 12 extends in the space between the inner and outer walls 16, 18. As shown in FIG. 5, the structure of the anchor 14 is symmetrical about a centreline X. Consequently, the description below refers to the structure on the left-hand side of the centreline X in FIGS. 5 to 7. It will be appreciated that the structure on the right-hand side corresponds.

The inner and outer walls 16, 18 are interconnected by a central wall 22 which separates two apertures 24 in the inner wall 16. The inner and outer walls 16, 18 are also interconnected by webs 26, 28. The section of the outer wall 18 that interconnects the webs 26, 28 forms a bridge 30, which defines a bridge passage 32 which opens to the exterior of the anchor 14. Openings 34 are provided in the inner wall 16 opposite the bridge 30. The bridge 30 prevents movement of the cord 12 away from the inner wall 16 and thus retains cord in the anchor regardless of the direction in which the cord 12 is pulled. The openings 34 provide space to accommodate the cord 12 as it passes beneath the bridge 30. This enables the height of the bridge (i.e. in the direction away from the inner wall 16) to be minimised, so enabling the profile, or thickness, of the anchor 14 as a whole to be kept low. This allows the side wall of the lid 4 to lie close to that of the body 2.

Inwardly of the bridge 30 on each side, i.e. nearer the centreline X, there is a pillar 36 which projects from the inner wall 16 towards the outer wall 18, the pillar 36 terminating within a recess 38 in the outer wall 18. Between the centreline X and the pillar 36, there is an anchoring cavity 40 which opens into the aperture 24. The region of the interior of the anchor 14 at the aperture 24 constitutes an anchorage chamber 42

As shown in FIG. 5, each end region of the cord 12 passes from the latch element 10 into the anchor 14 through the bridge passage 32, round the web 28 and between the web 28 and the pillar 36 into the anchoring cavity 40. A series of teeth or barbs 44 are provided in the anchoring cavity 40 and are oriented towards the central wall 22. The barbs 44 may be formed integrally with the inner and outer walls 16, 18, or they may take the form of separate inserts bonded, or otherwise secured, to the inner and outer walls 16, 18. The barbs 44 may be arranged on opposite sides of the anchoring cavity 40 so as to project towards one another. The barbs 44 may be flexible so that they can accommodate shrinkage of the cord 12 as it stretches.

As shown in FIG. 5 and seven, the cord 12 is fitted into the anchor 14 so that the end tip 46, which may be provided with an end fitting such as a shrink-fitted end cap 48, projects into the chamber 42. The cord then extends through the anchoring cavity 40, between the pillar 36 and the web 28, and to the exterior of the anchor 14 through the passage 32. It will be appreciated that from the lengthwise direction of the anchoring cavity 40, the cord 12 is deflected around two changes of direction along the path to the exterior of the anchor 14. Thus, one change of direction occurs as the cord 12 is guided around the pillar 36 as it passes between the pillar 36 and the web 28, and the other change of direction, in the opposite sense to the first change, takes place as the cord curves around the web 28 to pass through the passage 32. The path constituted by the anchoring cavity 40, the gap between the pillar 36 and the web 28, and the passage 32 is thus non-linear and, in combination with the action of the barbs 44, serves to resist withdrawal of the cord 12 from the anchor 14 under tension applied from the latch element 10. In other words, the changes of direction increase the frictional forces applied by the anchor 14 to the cord 12. These frictional forces reduce the retaining force that needs to be applied by the barbs 44 which in turn reduces the number of barbs 44 required and the extent to which they need to bite into the cord. The anchor 14 can thus be made more compact and the likelihood of the cord 12 being badly damaged by the barbs 44 is reduced.

To install the cord 12 into the anchor 14, the tip end 46 is inserted from below (as seen in FIGS. 2 and 5) through the passage 32 and is then curved round and pressed between the pillar 36 and the web 28. This operation is made possible by the access provided by the space between the walls 16, 18 and the clearance between the edge of the recess 38 and the pillar 36. The end region of the cord 12 can then be pushed from above (as seen in FIG. 2) between the inner and outer walls 16, 18 and forced onto the barbs 44 which are in the form of ribs extending parallel to the centreline X. If the barbs 44 are flexible, this operation causes them to flex towards the inner and outer walls 16, 18 respectively while remaining in firm contact with the cord 12. The end tip 46 of the cord seats within the chamber 24. Since the chamber 24 provides a clearance around the end tip 46, the cord is allowed to expand within the chamber 24 providing an enlarged boss which resists displacement of the cord 12 away from the centreline X.

It will be appreciated from the above, that the cord 12 can be installed into the anchor 14 without requiring any disassembly of the anchor 14. In particular, because the anchoring cavity 40 is open at the top, as viewed in FIGS. 2 and 5, there is access to enable the cord 12 to be pressed firmly into engagement with the barbs 44.

The configuration of the interior of the anchor 14, and in particular the non-linear path of the cord, means that tension applied to the cord 12 by the latch element 10 in any direction will not displace the cord 12 from the anchor 14. Furthermore, even if the cord 12 decreases in diameter under tension applied to it, the barbs 44 will continue to retain it securely in the anchor 14.

The anchor 14 is constructed so that it can be moulded in a single piece in a suitable moulding process, employing suitable displaceable cores. As shown in FIG. 1, the outer face of the lid 4 is provided with a thin cover 50 over the position of the anchor 14, to provide a clean appearance to the outer face of the lid 4.

For the avoidance of doubt, the present application extends to the subject-matter described in the following numbered Statements:

Statement 1. An anchor for securing an elastic cord, comprising first and second spaced walls which define between them and anchoring passage having an anchoring cavity at one end provided with at least one retaining tooth projecting into the anchoring cavity for locking engagement with a section of the cord extending in a lengthwise direction of the anchoring cavity, the anchoring passage providing a non-linear path from the anchoring cavity to the exterior of the anchor whereby an elastic cord situated in the anchoring passage undergoes at least two changes of direction between the anchoring cavity and the exterior of the anchor.

Statement 2. An anchor as in Statement 1, in which the anchoring cavity is provided at its end away from the non-linear path with a chamber for accommodating a cord tip.

Statement 3. An anchor as in Statement 1 or 2, in which the non-linear path is defined by a pillar extending from the first wall towards the second wall for guiding the cord in a first one of the changes of direction.

Statement 4. An anchor as in Statement 3, in which the pillar extends into a recess in the second wall.

Statement 5. An anchor as in Statement 4, in which there is a clearance between the pillar and the edge of the recess.

Statement 6. An anchor as in any one of the preceding Statements, in which the non-linear path is defined by a bridge section of the second wall, the bridge section being connected at each end to the first wall whereby the bridge section serves to guide the cord in a second one of the changes of direction.

Statement 7. An anchor as in Statement 6, in which the second change of direction is in the opposite sense to the first change of direction.

Statement 8. An anchor as in Statement 6 or 7, in which the bridge section provides a passage through which the cord passes to the exterior of the anchor.

Statement 9. An anchor as in Statement 8, in which the through direction of the passage extends transversely of the lengthwise direction of the anchoring cavity.

Statement 10. An anchor as in any one of the preceding Statements, in which an opening defined between the walls provides access from the exterior of the anchor to the anchoring cavity.

Statement 11. An anchor as in any one of the preceding Statements, in which a chamber is provided between the walls at the end of the anchoring cavity away from the non-linear path for accommodating a tip region of the cord.

Statement 12. An anchor as in any one of the preceding Statements, in which a cord is situated in the anchoring passage with a first section of the cord in locking engagement with the tooth of the anchoring cavity, a second section of the cord extending through the passage and undergoing at least two changes of direction, and a third section of the cord extending at the exterior of the anchor.

Statement 13. An anchor as in Statement 12 when appendant to Statement 2, in which a tip region of the cord is accommodated in the chamber.

Statement 14. An anchor as in Statement 13, in which the tip region of the cord is provided with an end fitting.

Statement 15. An anchor as in Statement 14, in which the end fitting comprises a shrink fitted sleeve.

Statement 16. An anchor as in any one of the preceding Statements, in which the passage is one of two passages disposed symmetrically about a centreline of the anchor.

Statement 17. An anchor as in Statement 16, in which opposite ends of a single cord are anchored in the respective passageways of the anchor to form a loop. Statement 18. An anchor as in Statement 17, in which the loop extends through a latching component.

Statement 19. A container provided with a latching arrangement, the latching arrangement including an elastic cord secured to the container by an anchor in accordance with any one of the preceding Statements.

Statement 20. A container as in Statement 19, which is a cargo pack for mounting on a bicycle.

The invention claimed is:

1. An anchor for securing an elastic cord, comprising:
   first and second spaced walls which define between them an anchoring passage;
   an anchoring cavity provided at one end of the anchoring passage;
   at least one retaining tooth projecting into the anchoring cavity for locking engagement with a section of the cord situated within the anchoring cavity;
   a non-linear path provided by the anchoring passage and extending from the anchoring cavity to the exterior of the anchor, the non-linear path undergoing at least two changes of direction between the anchoring cavity and the exterior of the anchor, wherein the non-linear path is defined by:
   a pillar extending from the first wall into a recess in the second wall;
   a bridge section of the second wall, the bridge section having opposite ends which are connected by respective webs to the first wall to provide a bridge passage, the anchoring passage extending from the anchoring cavity around the pillar to provide a first one of the changes of direction and through the bridge passage to provide a second one of the changes of direction.

2. An anchor as claimed in claim 1, wherein the anchoring cavity is provided at its end away from the non-linear path with a chamber for accommodating a cord tip.

3. An anchor as claimed in claim 1, wherein a clearance is provided between the pillar and the edge of the recess.

4. An anchor as claimed in claim 3, wherein the recess is formed in an edge of the second wall.

5. An anchor as claimed in claim 1, wherein the second change of direction is in the opposite sense to the first change of direction.

6. An anchor as claimed in claim 1, wherein the through direction of the bridge passage extends transversely of the lengthwise direction of the anchoring cavity.

7. An anchor as claimed in claim 1, wherein an opening is defined between the walls, the opening providing access from the exterior of the anchor to the anchoring cavity.

8. An anchor as claimed in claim 1, further comprising a cord which is situated in the anchoring passage, the cord having a first section in locking engagement with the tooth of the anchoring cavity, a second section extending through the anchoring passage and undergoing at least two changes of direction, and a third section extending at the exterior of the anchor.

9. An anchor as claimed in claim 8, wherein the anchoring cavity is provided at its end away from the non-linear path with a chamber for accommodating a cord tip, and wherein a tip region of the cord is accommodated in the chamber.

10. An anchor as claimed in claim 9, wherein the tip region of the cord is provided with an end fitting.

11. An anchor as claimed in claim 10, wherein the end fitting comprises a shrink fitted sleeve.

12. An anchor as claimed in claim 1, wherein the anchoring passage is one of two anchoring passages disposed symmetrically about a centreline of the anchor.

13. An anchor as claimed in claim 12, wherein opposite ends of a single cord are anchored in the respective anchoring passages of the anchor to form a loop.

14. An anchor as claimed in claim 13, wherein the loop extends through a latching component.

15. A container provided with a latching arrangement, the latching arrangement including an elastic cord secured to the container by an anchor comprising:

first and second spaced walls which define between them an anchoring passage within which the cord is situated;

an anchoring cavity provided at one end of the anchoring passage;

at least one retaining tooth projecting into the anchoring cavity, the retaining tooth being in locking engagement with a section of the cord situated within the anchoring cavity;

a non-linear path provided by the anchoring passage and extending from the anchoring cavity to the exterior of the anchor, the non-linear path undergoing at least two changes of direction between the anchoring cavity and the exterior of the anchor, wherein the non-linear path is defined by:

a pillar extending from the first wall into a recess in the second wall, the cord being deflected around the pillar;

a bridge section of the second wall, the bridge section having opposite ends which are connected by respective webs to the first wall to provide a bridge passage through which the cord extends, the anchoring passage extending from the anchoring cavity around the pillar to provide a first one of the changes of direction and through the bridge passage to provide a second one of the changes of direction.

16. A container as claimed in claim 15, comprising a cargo pack for mounting on a bicycle.

* * * * *